US012615592B2

(12) United States Patent
Ramamurthi et al.

(10) Patent No.: US 12,615,592 B2
(45) Date of Patent: Apr. 28, 2026

(54) DISCONTINUOUS RECEPTION FOR EXTENDED REALITY DEVICE POWER SAVINGS

(71) Applicant: Verizon Patent and Licensing Inc., Basking Ridge, NJ (US)

(72) Inventors: Vishwanath Ramamurthi, San Ramon, CA (US); Wei David Huang, Danville, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 18/354,867

(22) Filed: Jul. 19, 2023

(65) Prior Publication Data

US 2025/0031147 A1 Jan. 23, 2025

(51) Int. Cl.
*H04W 76/28* (2018.01)
*H04W 52/02* (2009.01)

(52) U.S. Cl.
CPC ....... *H04W 52/0225* (2013.01); *H04W 76/28* (2018.02)

(58) Field of Classification Search
CPC ............. H04W 52/0225; H04W 76/28; H04W 52/0216
See application file for complete search history.

(56) References Cited

U.S. PATENT DOCUMENTS

| | | | | |
|---|---|---|---|---|
| 2023/0103503 | A1* | 4/2023 | Awoniyi-Oteri | ............................ H04W 52/0216 370/329 |
| 2024/0090076 | A1* | 3/2024 | Hande | ................. H04W 40/005 |
| 2024/0349390 | A1* | 10/2024 | Abotabl | ................ H04W 76/28 |
| 2024/0349393 | A1* | 10/2024 | Tayyab | ................. H04W 76/28 |
| 2025/0081003 | A1* | 3/2025 | Zhang | .................... H04W 24/08 |
| 2025/0151155 | A1* | 5/2025 | Mazloum | .............. H04W 76/28 |
| 2025/0254617 | A1* | 8/2025 | Xu | ......................... H04W 76/28 |
| 2025/0358893 | A1* | 11/2025 | Yuan | .................... H04L 1/1851 |

FOREIGN PATENT DOCUMENTS

| | | | | |
|---|---|---|---|---|
| WO | WO-2023151030 | A1 * | 8/2023 | .............. H04W 4/50 |
| WO | WO-2024035827 | A1 * | 2/2024 | ........ H04W 52/0216 |

OTHER PUBLICATIONS

Qualcomm Incorporated, "Power Saving Techniques for XR", 3GPP TSG RAN WG1 #109-e, R1-2205054 (Year: 2022).*
Moderator (Qualcomm Incorporated), "Moderator Summary#1 on XR specific power saving techniques", 3GPP TSG RAN WG1 #109-e, R1-2205055 (Year: 2022).*
China Telecom, "Discussion on XR enhancement for NR", 3GPP TSG RAN WG1 Meeting #109-e, R1-2203666 (Year: 2022).*
Sony, "Considerations on power saving techniques for XR", GPP TSG RAN WG1 #109-e, R1-2203744 (Year: 2022).*

* cited by examiner

*Primary Examiner* — Phirin Sam
*Assistant Examiner* — Mang Boi Thawng

(57) ABSTRACT

A device determines a periodicity of downstream traffic destined for a User Equipment device (UE) and sets a value of at least one Discontinuous Reception (DRx) cycle length parameter to compensate for the determined periodicity of the downstream traffic. The device generates UE DRx instructions that include the at least one DRx cycle length parameter and sends the UE DRx instructions to the UE for implementing DRx at the UE.

20 Claims, 14 Drawing Sheets

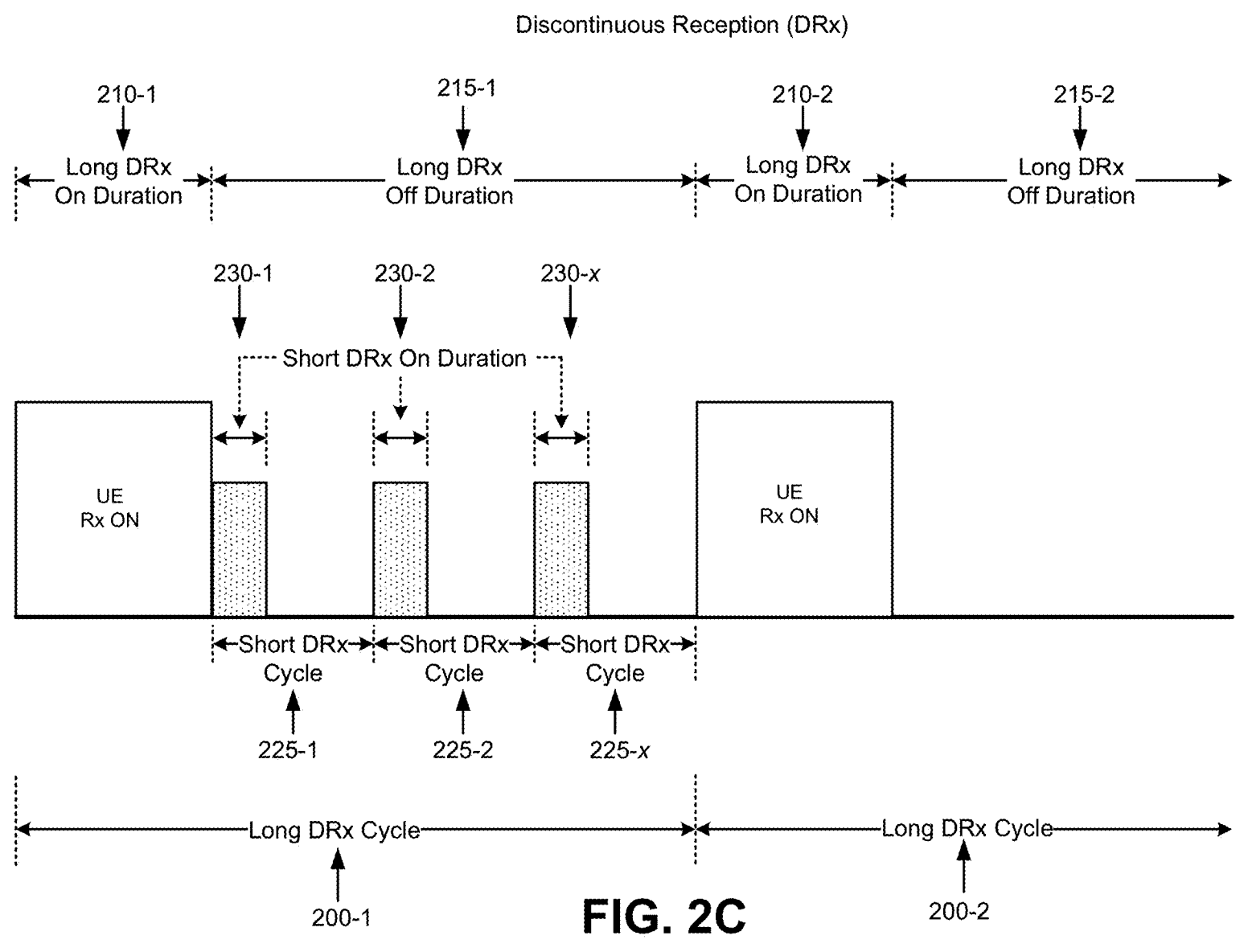

Discontinuous Reception (DRx)

210-1 → Long DRx On Duration 215-1 → Long DRx Off Duration 230-1 →
230-2 →
230-x →

Short DRx On Duration 210-2 → Long DRx On Duration 215-2 → Long DRx Off Duration UE Rx ON UE Rx ON 225-1 → Short DRx Cycle 225-2 → Short DRx Cycle 225-x → Short DRx Cycle 200-1 → Long DRx Cycle 200-2 → Long DRx Cycle

FIG. 2C

Video Traffic at 60 fps

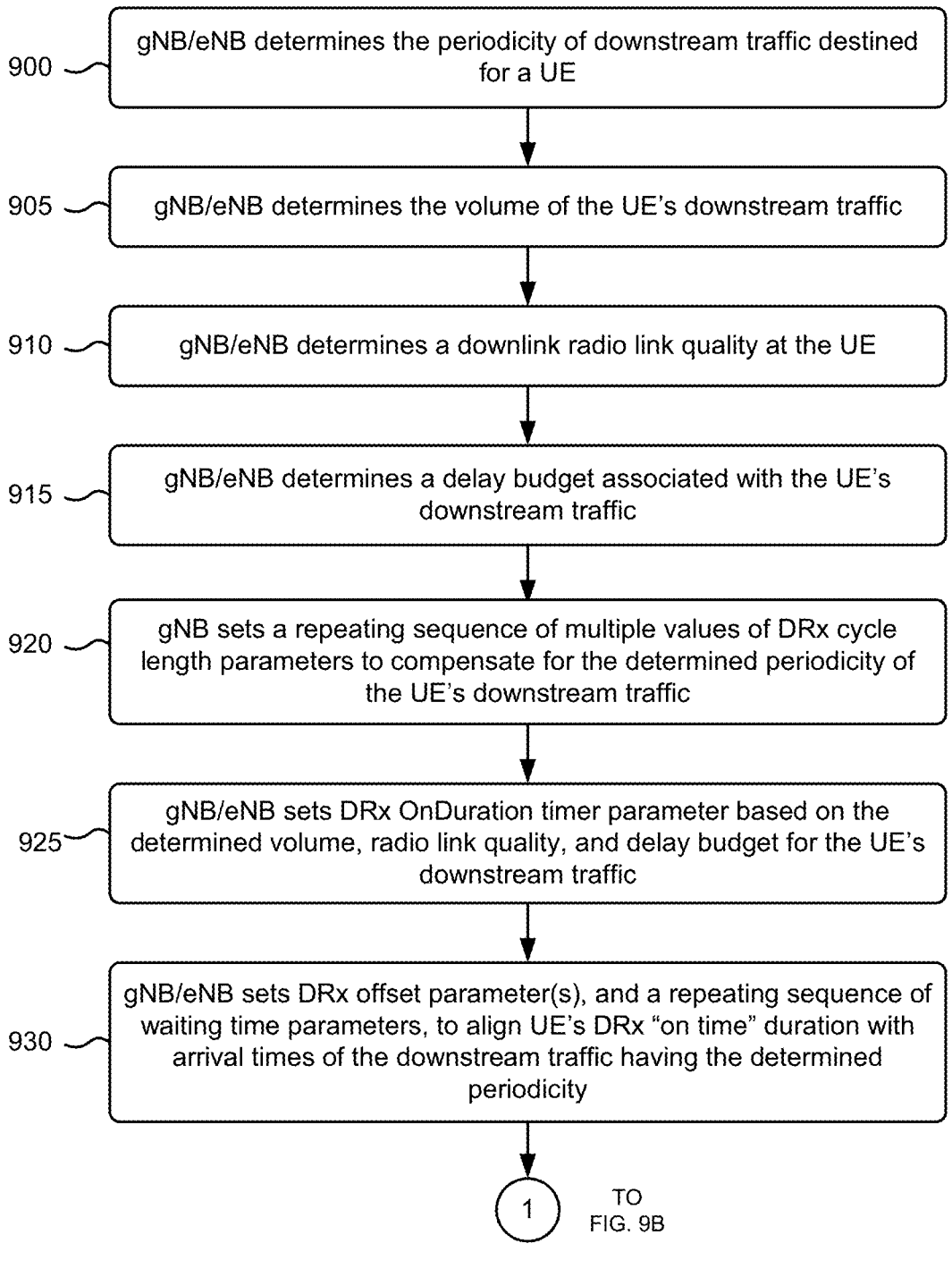

900 — gNB/eNB determines the periodicity of downstream traffic destined for a UE 905 — gNB/eNB determines the volume of the UE's downstream traffic 910 — gNB/eNB determines a downlink radio link quality at the UE 915 — gNB/eNB determines a delay budget associated with the UE's downstream traffic 920 — gNB sets a repeating sequence of multiple values of DRx cycle length parameters to compensate for the determined periodicity of the UE's downstream traffic 925 — gNB/eNB sets DRx OnDuration timer parameter based on the determined volume, radio link quality, and delay budget for the UE's downstream traffic 930 — gNB/eNB sets DRx offset parameter(s), and a repeating sequence of waiting time parameters, to align UE's DRx "on time" duration with arrival times of the downstream traffic having the determined periodicity

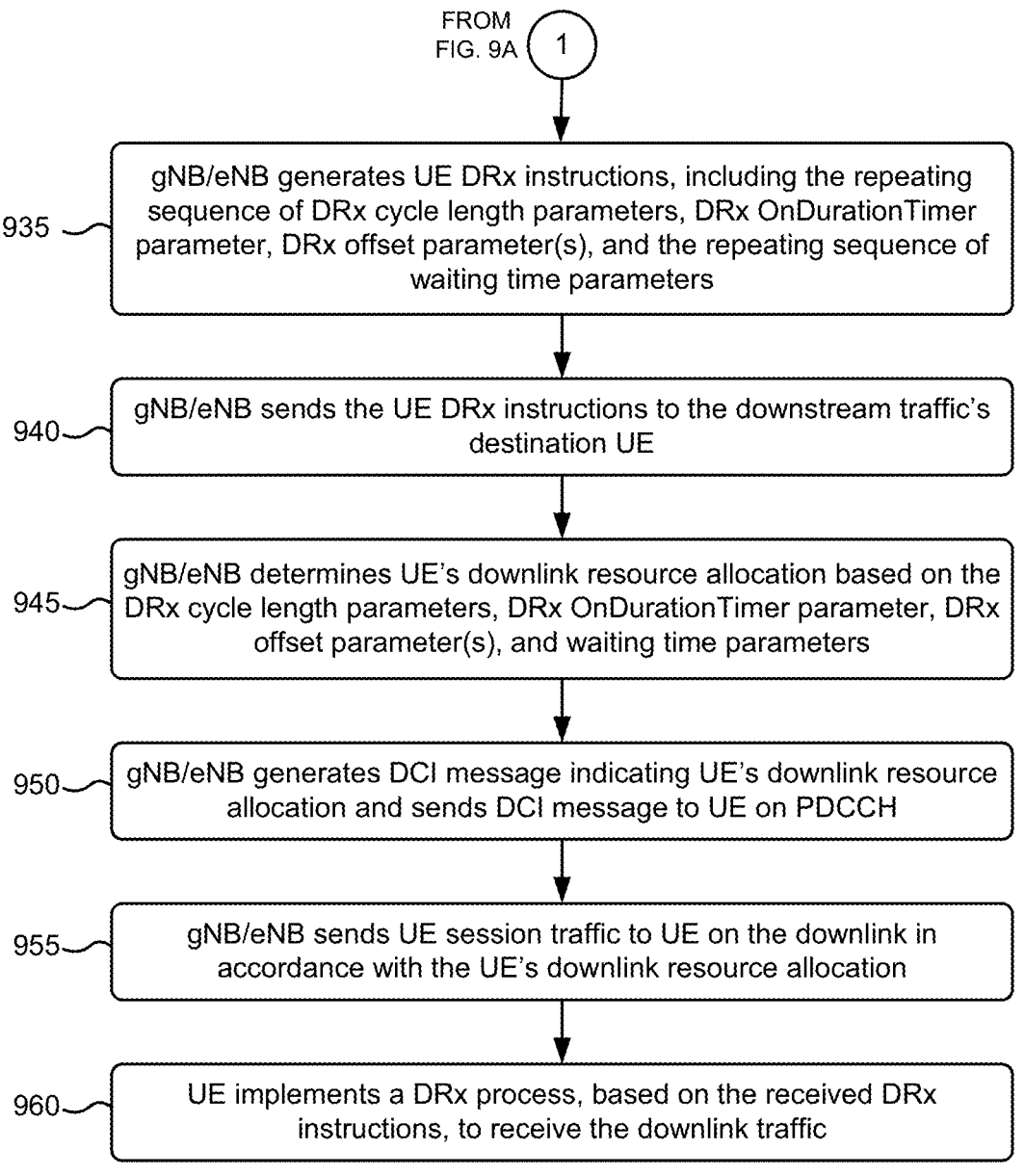

FROM
FIG. 9A   1

935 — gNB/eNB generates UE DRx instructions, including the repeating sequence of DRx cycle length parameters, DRx OnDurationTimer parameter, DRx offset parameter(s), and the repeating sequence of waiting time parameters 940 — gNB/eNB sends the UE DRx instructions to the downstream traffic's destination UE 945 — gNB/eNB determines UE's downlink resource allocation based on the DRx cycle length parameters, DRx OnDurationTimer parameter, DRx offset parameter(s), and waiting time parameters 950 — gNB/eNB generates DCI message indicating UE's downlink resource allocation and sends DCI message to UE on PDCCH 955 — gNB/eNB sends UE session traffic to UE on the downlink in accordance with the UE's downlink resource allocation 960 — UE implements a DRx process, based on the received DRx instructions, to receive the downlink traffic

FIG. 9B

DISCONTINUOUS RECEPTION FOR EXTENDED REALITY DEVICE POWER SAVINGS

BACKGROUND

Discontinuous reception (DRx) involves a process of turning off a device's receiver when the device does not expect to receive incoming messages. DRx, due to powering down the components of the receiver, reduces power drain on the device's battery. For DRx to operate, such as in the context of a wireless mobile network, the device must coordinate with the wireless mobile network to schedule incoming messages such that the device's receiver wakes up during scheduled periods to receive the incoming messages.

BRIEF DESCRIPTION OF THE DRAWINGS

FIGS. 2A-2C depict timing diagrams associated with a discontinuous reception (DRx) process;

FIGS. 9A and 9B are flow diagrams of an example process for implementing DRx for XR traffic power savings at a User Equipment device.

DETAILED DESCRIPTION OF EXAMPLE EMBODIMENTS

Figure 1A:
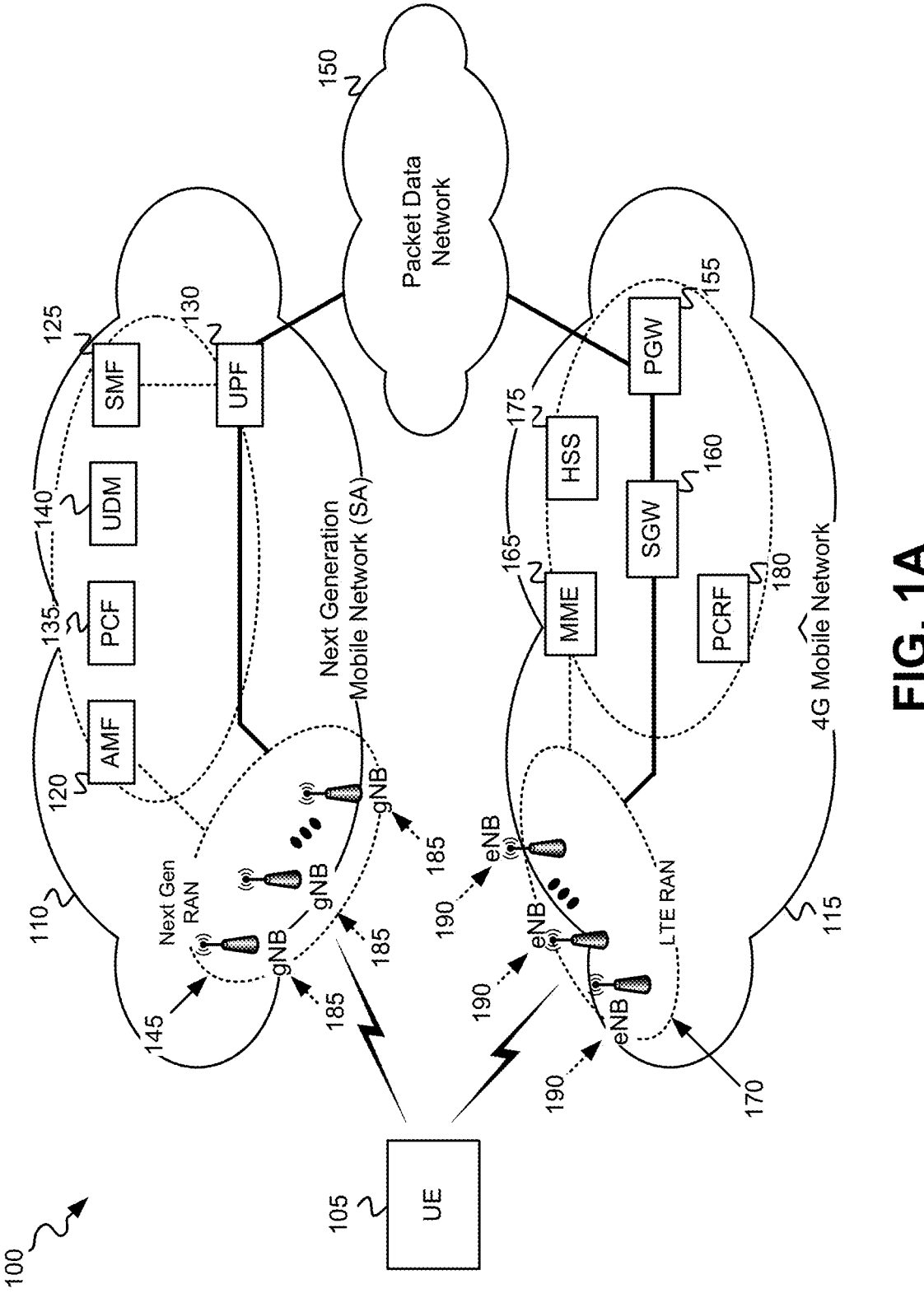
FIGS. 1A and 1B depict two examples of a network environment in which DRx parameters are modified for Extended Reality traffic to effectuate User Equipment device power savings and to improve the efficiency of Extended Reality traffic reception at UEs.

The following detailed description refers to the accompanying drawings. The same reference numbers in different drawings may identify the same or similar elements. The following detailed description does not limit the invention.

Extended Reality (XR) involves a number of different but related technologies, including Virtual Reality (VR), Augmented Reality (AR), and Mixed Reality (MR). XR technology modifies the standard human-to-computer screen interface by immersing the user in a virtual environment (e.g., VR); adding to, or augmenting, the user's surroundings (e.g., AR); or both immersing the user in the virtual environment and augmenting the user's surroundings (e.g., MR). VR is an immersive computing or gaming experience where the user's entire field of vision may be filled via the device's display. AR captures live video of a device's surroundings and then adds visual elements to it. MR blends both VR and AR together.

XR devices typically require a large network bandwidth and a low latency and may consume a large amount of power when providing a XR experience to the user. Mobile XR devices (e.g., User Equipment devices (UEs)) are expected to be of small form factor, with limited battery resources, so as to not be too heavy to permit end-user mobility. Reducing power consumption on mobile XR devices is therefore an important issue for extending battery charge life and increasing the interval between battery recharging.

DRx is one mechanism that may be used to reduce power consumption on mobile XR devices. Current DRx mechanisms, however, have certain limitations when handling XR type traffic. Such limitations include 1) non-integer XR traffic periodicity, 2) misalignment of DRx cycles with XR traffic characteristics, and 3) changing XR traffic volume. Downstream XR traffic involves video data to a large extent. Video traffic is generated at certain frames per second (e.g., 30 fps, 60 fps, 120 fps) that creates non-integer periods (e.g., 33.33 ms, 16.66 ms, 8.33 ms) which are not aligned with typical Next Generation network DRx periods that are set as fixed integer periods, such as, for example, integer multiples of milliseconds. Downstream XR traffic also tends to be quasi-periodic in nature, unlike typical web traffic which is more sporadic. This quasi-periodicity results in misalignment between UE DRx cycles and XR traffic arrivals. For example, the XR device might be in a DRx off state when XR traffic arrives, and in a DRx on state when there is no XR traffic. XR traffic also tends to change over time and therefore may vary significantly from period to period. This varying XR traffic volume results in the typical fixed duration DRx timers being inefficient.

Example embodiments described herein modify values of DRx parameters associated with performing DRx at a UE to synchronize and align the DRx cycles with a non-integer periodicity of XR traffic (e.g., XR video traffic) to improve the efficiency of data transmission on the downlink between the Radio Access Network and the UE. The DRx parameter modification may include generating a repeating sequence of DRx cycle length values (e.g., DRx long cycles or DRx short cycles), along with a repeating sequence of waiting times, to align the periodic "on duration" of the DRx process at the UE with the non-integer period of the downlink XR traffic. The DRx parameter modification may further include setting a value of the OnDuration timer parameter of the DRx process based on a traffic volume, downlink radio link quality, and delay budget associated with the UE that is the destination for XR traffic. The DRx parameter modification may additionally include setting a value of one or more DRx offset parameters to synchronize and align the "on duration" of the UE's receiver with the XR traffic downlink transmissions.

Figure 1B:
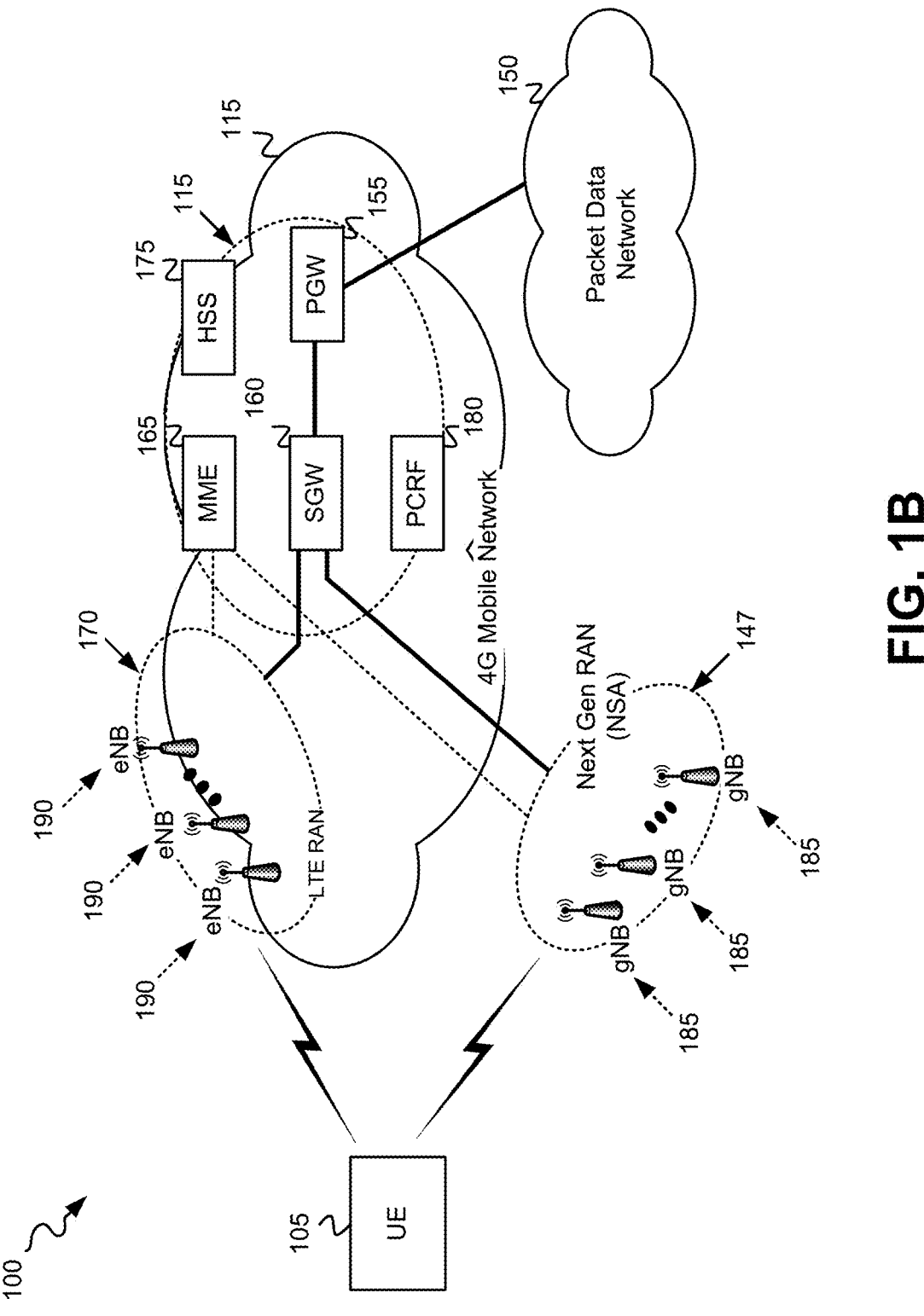

FIGS. 1A and 1B depict two examples of a network environment 100 in which DRx parameters are modified for XR traffic to effectuate UE power savings and to improve the efficiency of XR traffic reception at UEs. In the first example of network environment 100, shown in FIG. 1A, the network environment 100 includes a UE 105 that may wirelessly communicate with a stand-alone (SA) Next Generation mobile network 110 and/or a Fourth Generation (4G) mobile network 115. In the example network environment 100 of FIG. 1A, UE 105 may establish a wireless connection with Next Generation Mobile Network 110 and/or 4G Mobile Network 115, to communicate with another UE (not shown) or with another network node, such as, for example, a server.

UE 105 may include any type of electronic device having a wireless communication capability. UE 105 may include, for example, a laptop, palmtop, desktop, or tablet computer; a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device;

an XR device (e.g., an AR or VR headset or glasses); or an Internet of Things (IoT) or Machine-to-Machine (M2M) device. A user (not shown) may carry, use, administer, and/or operate UE 105. Though only a single UE 105 is depicted in FIG. 1A, network environment 100 may include multiple UEs 105 communicating via networks 110 and/or 115.

Next Generation mobile network 110 includes any type of a Public Land Mobile Network (PLMN) that includes evolved network components (e.g., future generation components) relative to a Long-Term Evolution (LTE) network, such as a Fourth Generation (4G) or 4.5G mobile network. In one implementation, shown in FIG. 1A, Next Generation Mobile network 110 may include a Fifth Generation (5G) mobile network. 4G network 115 includes any type of a PLMN that implements a LTE mobile telecommunications standard, such as the 4G or 4.5G LTE standard.

As shown in the example implementation of FIG. 1A, in which Next Generation Mobile Network 110 includes a 5G Stand-Alone (SA) mobile network, network 110 may include, among other nodes, functions, or components, an Access and Mobility Management Function (AMF) 120, a Session Management Function (SMF) 125, a User Plane Function (UPF) 130, a Policy Control Function (PCF) 135, a User Data Management (UDM) function 140, and a Next Generation Radio Access Network (RAN) 145.

AMF 120 may include functions executed by a network device to perform UE-based authentication, authorization, and mobility management for UE 105. SMF 125 may include functions executed by a network device to perform session management and to select and control particular nodes (e.g., User Plane Functions (UPFs)) for data transport, including applying policy rules received from PCF 135. UPF 130 may include functions executed by a network device to act as a router and a gateway between Next Generation Mobile network 110 and an external packet data network 150, and to forward session data between the packet data network 150 and Next Generation RAN 145. Though only a single UPF 130 is shown in FIG. 1A, Next Generation Mobile network 110 may include multiple UPFs 130 disposed at various geographic locations in network 110. Packet data network 150 may include any type of packet-switching network, such as, for example, the Internet.

PCF 135 may include functions executed by a network device to implement policy control for service data flows and Protocol Data Unit (PDU) session related policy control. For example, PCF 135 may store and/or generate policy rule sets that may apply to traffic from different UEs 105 and may supply one or more policy rules to a SMF 125 handling a UE session. UDM 140 may include functions executed by a network device to manage data for user access authorization, user registration, and data network profiles. UDM 140 may include, or operate in conjunction with, a User Data Repository (UDR—not shown) which stores user data, such as customer profile information, customer authentication information, and encryption keys.

Next Generation RAN 145 may include at least one Central Unit (CU) (not shown), one or more Distributed Units (DUs) (not shown), and one or more Radio Units (RUs)(not shown). Each CU includes a network device that operates as a digital function unit that transmits digital baseband signals to the multiple DUs, and receives digital baseband signals from the multiple DUs. If a CU is connected to the multiple DUs via, for example, optical fibers, then the CU may convert the digital baseband signals into corresponding optical signals for transmission to the DUs, and may receive optical signals from the DUs and convert the optical signals into corresponding digital baseband signals. The DUs and RUs include network devices that operate as radio function units that transmit and receive radio frequency (RF) signals to/from UEs 105. Each of the RUs may include at least one antenna array, transceiver circuitry, and other hardware and software components for enabling the RUs to receive data via wireless RF signals from UEs 105, and to transmit wireless RF signals to UEs 105. If Next Generation Mobile network 110 is a 5G New Radio (NR) network, a CU and DUs represent a distributed Next Generation NodeB, which may also be referred to herein as a "gNB" or a "base station." The CU and DUs may also represent an enhanced LTE (eLTE) eNB, also referred to herein as a "base station," that can connect to Next Generation Mobile network 110.

As shown in the example implementation of FIG. 1A, network environment 100 may further include a 4G mobile network 115. 4G mobile network 115 may include, among other functions, nodes, or components, a Packet Gateway (PGW) 155, a Serving Gateway (SGW) 160, a Mobility Management Entity (MME) 165, a Home Subscriber Server (HSS) 175, a Policy and Charging Rules Function (PCRF) 180, and an LTE RAN 170.

PGW 115 includes functions executed by a network device to act as a router and a gateway between 4G network 130 and the external packet data network 150, and to forward session data between the packet data network 150 and an LTE RAN 170. SGW 160 includes functions executed by a network device to route and forward session data between PGW 155 and the LTE RAN 170 serving the UE session. MME 165 includes functions executed by a network device to act as a control entity for 4G Mobile Network 115, including communicating with HSS 175 for user/device authentication and for user/device profile download. MME 235 further provides UE 105 with mobility management and session management functions using, for example, Network Access Stratum (NAS) signaling. HSS 175 includes functions executed by a network device to perform user authentication, session establishment, and/or access authorization based on stored subscriber service profiles. PCRF 180 includes functions executed by a network device to deploy policy and charging rules to allocate network resources and manage charges for services and subscribers.

LTE RAN 170 may include baseband units (BBUs—not shown) and remote radio heads (RRHs—not shown). Each BBU may connect to multiple RRHs via, for example, optical fibers, and may operate as a digital function unit that transmits digital baseband signals to the multiple RRHs and receives digital baseband signals from the multiple RRHs. The RRHs include network devices that operate as radio function units that transmit and receive radio frequency (RF) signals to/from UE 105. If the RRHs are connected to a BBU via an optical fiber, the RRHs may convert received RF signals to optical signals and transmit the optical signals to the BBU. Additionally, the RRHs may receive optical signals from the BBU via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 105, and to transmit wireless RF signals to UE 105. In 4G mobile network 115, a BBU and a RRH represent a distributed eNB, such as is shown in FIG. 1A, and may also be referred to herein as a "base station."

In the second example of a network environment 100, shown in FIG. 1B, the network environment 100 includes a UE 105 that may wirelessly communicate with a hybrid 4G/Next Generation mobile network. The hybrid 4G/Next Generation mobile network may include a 4G mobile network 115, such as is described above with respect to FIG. 1A, that further connects with a Non-Stand Alone (NSA) Next Generation RAN 147. NSA Next Generation RAN 147 includes components similar to those described above with respect to Next Generation RAN 145 of FIG. 1A. In the example network environment 100 of FIG. 1B, UE 105 may establish a wireless connection with 4G mobile network 115, via either LTE RAN 170 and/or NSA Next Generation RAN 147, to communicate with another UE (not shown) or with another network node, such as a server.

The configuration of network components of network environment 100 shown in FIGS. 1A and 1B is for illustrative purposes. Other configurations may be implemented. Therefore, network environment 100 may include additional, fewer, and/or different components that may be configured in a different arrangement than that depicted in FIG. 1A or 1B. For example, network environment 100 may include numerous UEs (e.g., UEs 105-1 through 105-x, where x>2). Further, network environment 100 may include additional networks not shown in FIG. 1A or 1B.

Figure 2A:
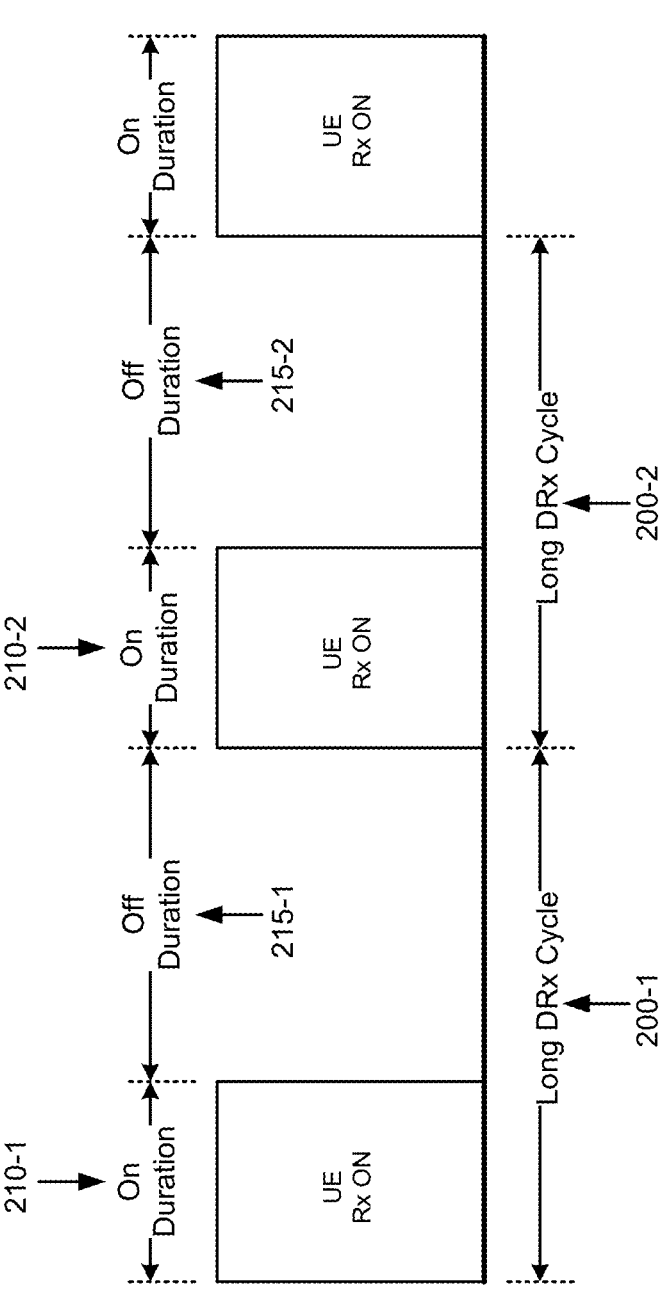
Figure 2B:
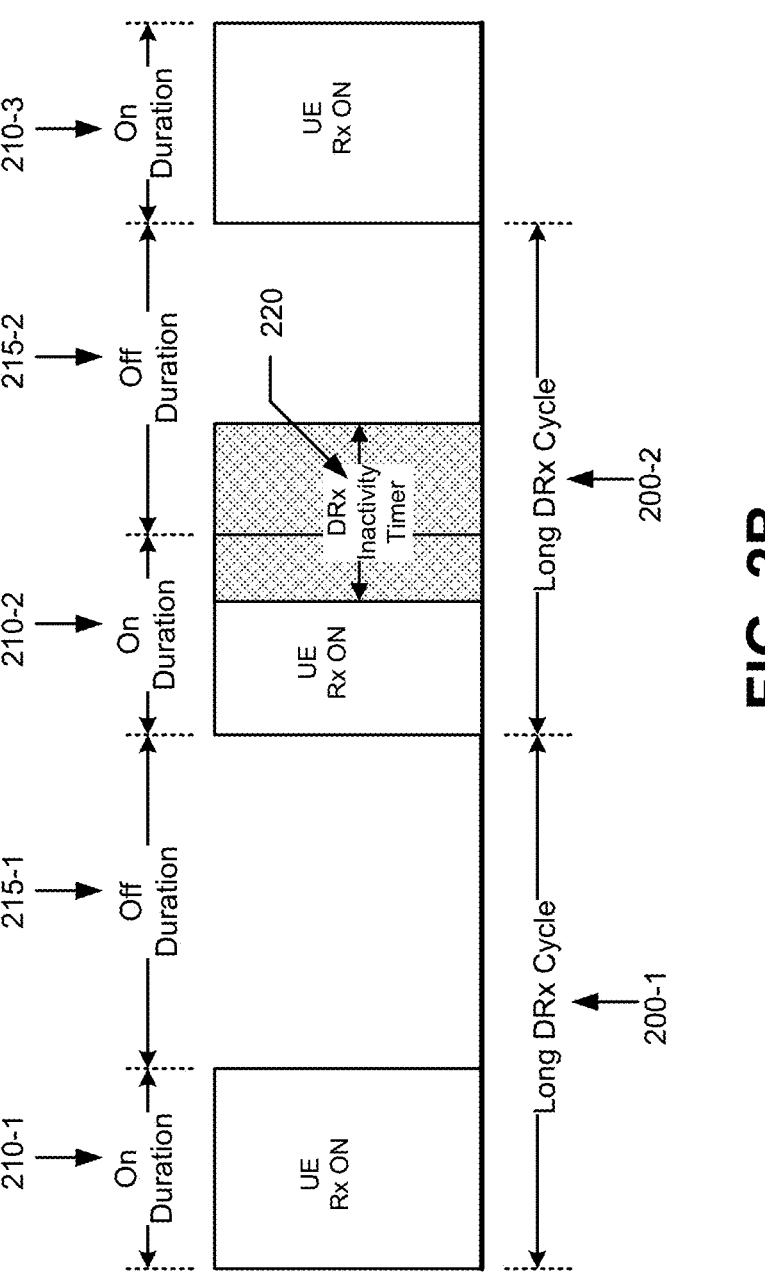

FIGS. 2A-2C depict timing diagrams associated with a discontinuous reception (DRx) process consistent with embodiments described herein. The DRx process, as described further below, controls a time duration over which the UE 105 waits, due to components of the UE 105 being in a powered down state during the DRx process, before the components resume a powered-up state and the UE 105 may then receive signaling or data on a downlink from the mobile network. As shown in FIG. 2A, DRx may include a sequence of DRx cycles, referred to herein as "long DRx cycles," that occur one after another over a period of time. For example, as shown in FIG. 2A, the DRx process may include a first long DRx cycle 200-1, followed by a second long DRx cycle 200-2, and so on. A length (e.g., in milliseconds (ms)) of each long DRx cycle 200 may be set by a DRx-LongCycle parameter value. Each long DRx cycle 200 includes an "on duration" period, during which components of the UE 105 are in a powered up state to receive RF signals, and an "off duration" period, during which one or more components of the UE 105 are in a powered down state, or sleep state, to conserve UE power. In the example shown in FIG. 2A, the first long DRx cycle 200-1 includes an on duration period 210-1 and an off duration period 215-1. The second long DRx cycle 200-2 includes an on duration period 210-2 and an off duration period 215-2, and so on. Such on duration and off duration periods may be referred to generally as "on duration period 210" and "off duration period 215." The on duration period 210 may be specified by an "ON Duration Timer," referred to also as the DRx-OnDurationTimer parameter, that sets the duration of the on duration period 210 within one long DRx cycle.

FIG. 2B further depicts a DRx inactivity timer 220 associated with the DRx process of FIG. 2A. The DRx inactivity timer 220 includes a timer value, also referred to herein as the DRx-InactivityTimer parameter, that specifies how long the UE 105's receiver should remain "on," before powering down, after the receipt of a signal on a control channel (e.g., the Physical Downlink Control Channel (PDCCH)) from the RAN 145, 147, or 170.

FIG. 2C depicts an additional sequence of DRx cycles, referred to herein as "short DRx cycles," that may occur one after another over a period of time during an off Duration

215 of a long DRx cycle 200. In FIG. 2C, the "on duration" of FIG. 2A is shown in FIG. 2C as a "Long DRx On Duration" and the "off duration" is shown as a "Long DRx Off Duration." For example, the first long DRx Cycle 200-1 includes a Long DRx On Duration 210-1 and a Long DRx Off Duration 215-1, and the second long DRx Cycle 200-2 includes a Long DRx On Duration 210-1 and a Long DRx Off Duration 215-2. The short DRx cycles may occur one after another during a Long DRx Off Duration 215 of a Long DRx Cycle 200. For example, as shown, multiple short DRx cycles 225-1 through 225-x may occur during Long DRx Off Duration 215-1, with each short DRx cycle 225 including a short DRx On Duration 230-1 through 230-x, respectively. A duration of a short DRx cycle 225 may be specified by a "DRx Short Cycle Timer," also referred to herein as the DRx-ShortCycle parameter, that sets a duration of time that the UE 105 shall follow a short DRx cycle after the DRx Inactivity Timer 220 has expired.

Figure 3:
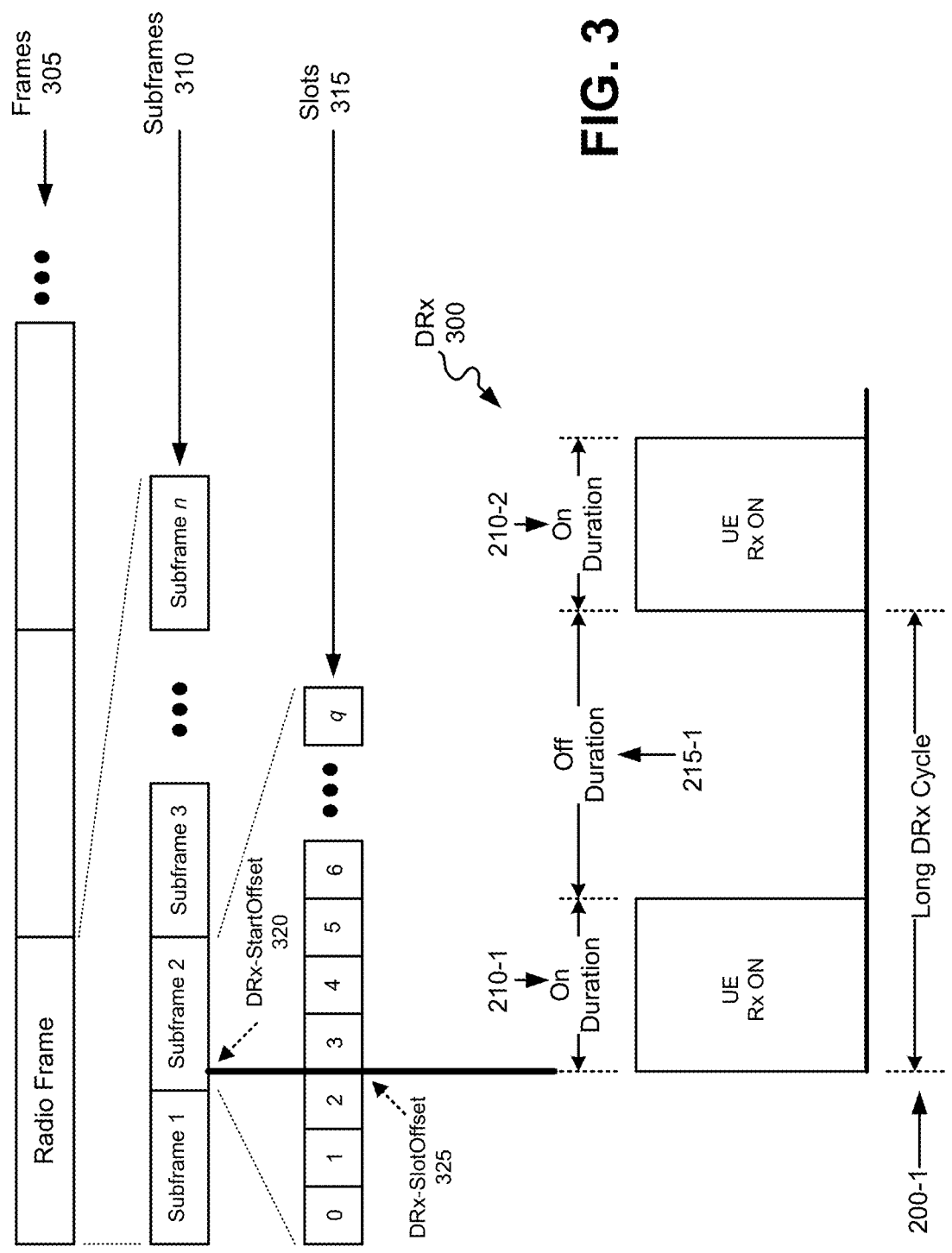
FIG. 3 illustrates an example of a relationship between downlink radio frames, subframes, and slots, and the timing of a DRx process executed at a User Equipment device.

FIG. 3 illustrates an example of a relationship between downlink radio frames, subframes, and slots, and the timing of a DRx process 300 executed at a UE 105 (not shown). As shown, downlink resources may be divided into multiple repeating frames 305, with each frame 305 being composed of n subframes 310. Each subframe 310 is further composed of q slots 315 in which symbols associated with downlink data may be transmitted. In a 5G implementation, each frame 305 may have a 10 ms duration and may be composed of ten subframes 310. Each of the ten subframes 310 may have a 1 ms duration. Each subframe 310 can have 2 slots 315, with each slot having a number (e.g., 14) of Orthogonal Frequency-Division Multiplexed (OFDM) symbols. Each subframe 310 may have a fixed duration (e.g., 1 ms) whereas each slot 315 may have a duration that varies based on a subcarrier spacing and a number of slots 315 per subframe 310. For example, a subcarrier spacing of 15 Kiloherz (KHz) occupies one slot 315 per subframe 310, and a subcarrier spacing of 30 KHz occupies two slots 315 per subframe 310.

As further shown in FIG. 3, a subframe offset value, referred to herein as the DRx-StartOffset parameter 320, specifies the particular subframe 310 at which the long DRx cycle 200-1 of the DRx process 300 starts. In the example of FIG. 3, long DRx cycle 200-1 of DRx process 300 starts at subframe 2 of the sequence of subframes 310. Additionally, a slot offset value, referred to herein as the DRx-Slot Offset parameter 325, specifies the particular time slot 315 within the subframe 310, specified by the DRx-StartOffset parameter 320, at which the long cycle DRx cycle 200-1 of the DRx process 300 starts. In the example of FIG. 3, long DRx cycle 200-1 of DRx process 300 starts at time slot 3 within subframe 2.

The DRx-StartOffset parameter 320 and the DRx-Slot-Offset parameter 325 shown in FIG. 3 enable the DRx process 300 to be adjusted and synchronized with the frames 305, subframes 310 and slots 315 of the downlink such that the arrival of data traffic transmitted from gNBs 185 of Next Generation RAN 145 or NSA Next Generation RAN 147, or eNBs 190 of LTE RAN 170, coincides with on duration intervals (e.g., on duration 210-1, on duration, 210-2, etc.) of the DRx process 300. The synchronization of the start of the DRx process 300 with frames 305, subframes 310, and slots 315 may also be performed in conjunction with setting a repeating sequence of integer values for DRx cycle lengths, such as described below with respect to FIGS. 4-6.

Figure 4:
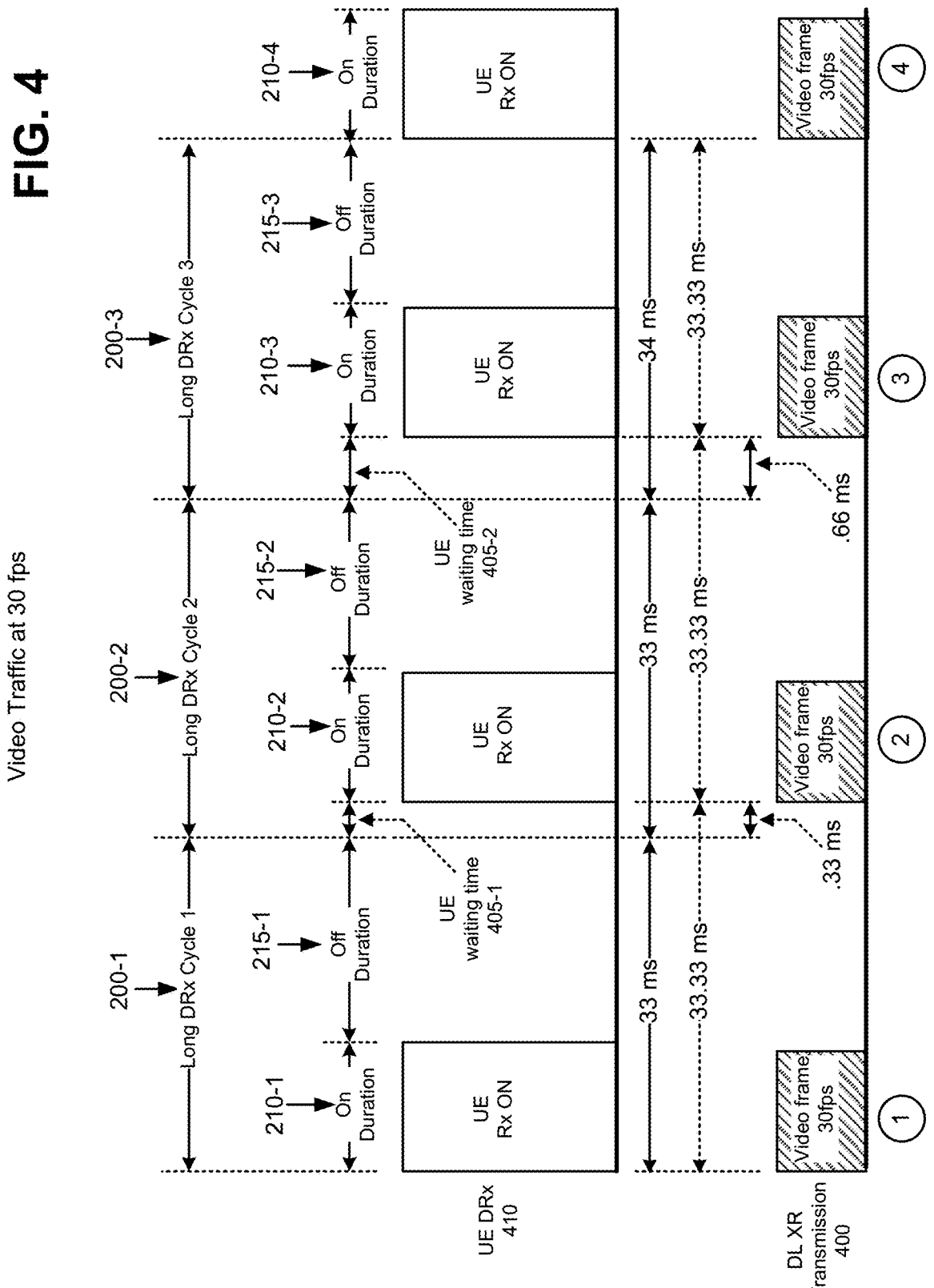
FIGS. 4-6 depicts an example of the generation of video traffic at 30 fps, 60 fps, and 120 fps, and aligning the DRx process to a non-integer periodicity of the video traffic on the downlink.
Figure 5:
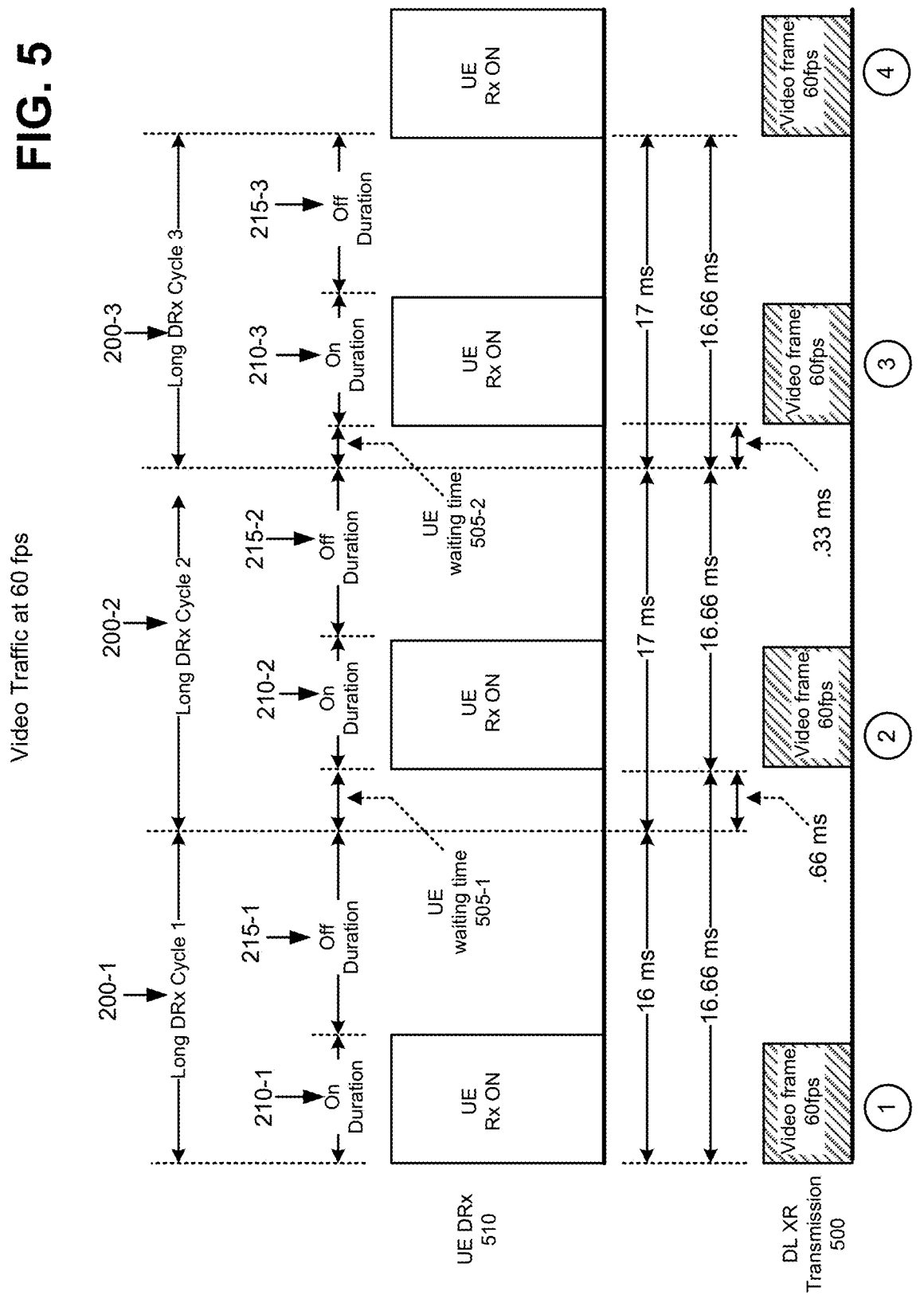
Figure 6:
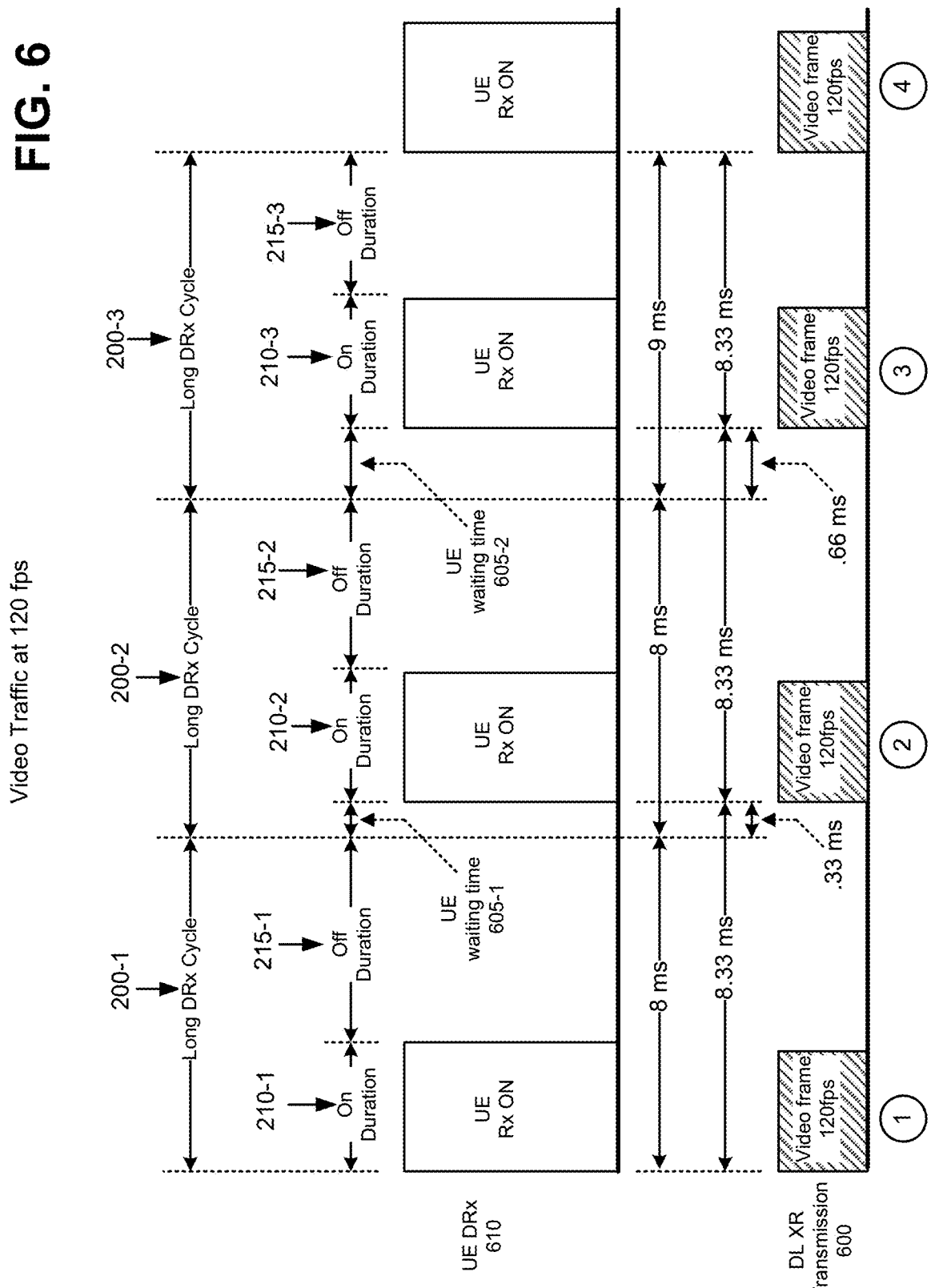

FIGS. 4-6 illustrate examples of the use of a repeating sequence of multiple integer values for DRx cycle lengths, and a corresponding repeating sequence of UE waiting times, to align the periodicity of the DRx process with the non-integer periodicity of the downlink UE traffic. Since XR traffic principally involves video traffic, which is generated at particular frame rates depending on the application (e.g., 30 frames per second (fps), 60 fps, or 120 fps), the arrival times of the XR traffic at the UE will likely occur at a non-integer periodicity. For example, the periodicity of video frames at 30 fps is approximately 33.33 ms between successive frames. As another example, the periodicity of video frames at 60 fps is approximately 16.66 ms between successive frames. A sequence of integer values for DRx cycle lengths may be used, in conjunction with a UE waiting time duration, to align the DRx on duration with the non-integer periodicity of the arriving downlink XR traffic.

FIG. 4 depicts an example of the generation of video traffic at 30 fps, and aligning the DRx process to a non-integer periodicity of the video traffic on the downlink using a repeating sequence of multiple integer values for DRx cycle lengths, and a corresponding repeating sequence of UE waiting times. In the example of FIG. 4, the repeating sequence of DRx cycle lengths includes 33 ms, 33 ms, 34 ms, 33 ms, 33 ms, 34 ms, etc. In conjunction with the repeating cycle of DRx cycle lengths, the UE additionally implements a repeating sequence of waiting times that include 0.33 ms, 0.66 ms, 0 ms, 0.33 ms, 0.66 ms, 0 ms, etc.

FIG. 4 shows the DL XR transmission 400 that includes a first video frame (identified with a "1") transmitted on the downlink at a beginning of the first long DRx cycle 200-1 having a 33.33 ms duration, a second video frame (identified with a "2") transmitted on the downlink at a beginning of the second long DRx cycle 200-2 having a 33.33 ms duration, a third video frame (identified with a "3") transmitted on the downlink at a beginning of the third long DRx cycle 200-3 having a 33.33 ms duration, and a fourth video frame (identified with a "4") transmitted on the downlink at a beginning of a fourth DRx cycle (not shown) having a 33.33 ms duration. With the long DRx cycle lengths having a repeating sequence (e.g., long DRx cycle 200-1 of 33 ms, long DRx cycle 200-2 of 33 ms, and long DRx cycle 200-3 of 34 ms), to align the UR DRx on duration 410 with the DL XR transmission 40, the sequence of UE wait times are repeated at the UE: 0.33 ms, 0.66 ms, and 0 ms. Therefore, when the DRx long cycle 200-1 finishes after 33 ms, the UE waits a waiting time 405-1 of 0.33 ms before starting the on duration 210-2 for the UE DRx process 410, aligning the next video frame at 30 fps and its transmission on the DL.

When DRx long cycle 200-2 finishes after 33 ms, the UE waits a waiting time 405-2 of 0.66 ms before starting the on duration 210-3 for the UE DRx process 410, aligning the next video frame at 30 fps and its transmission on the DL. When DRx long cycle 300-3 finishes after 34 ms, the UE waits a waiting time of 0 ms (i.e., no delay, with the on duration 210-4 starting at a same time as a beginning of a next long DRx cycle 200) before starting the on duration 210-4 since, with the cycle length of 34 ms, the video frame at 30 fps is already aligned with the on duration 210-4 for the UE DRx process 410. The sequence of DRx cycle lengths, and corresponding UE waiting times, shown in FIG. 4 may be repeated for the duration of the downlink XR traffic session involving video traffic at 30 fps.

FIG. 5 depicts an example of the generation of video traffic at 60 fps, and aligning the DRx process to a non-integer periodicity of the video traffic on the downlink using a repeating sequence of multiple integer values for DRx cycle lengths, and a corresponding repeating sequence of UE waiting times. In the example of FIG. 5, the repeating sequence of DRx cycle lengths includes 16 ms, 17 ms, 17 ms, 16 ms, 17 ms, 17 ms, etc. In conjunction with the repeating cycle of DRx cycle lengths, the UE additionally implements a repeating sequence of waiting times that include 0.66 ms, 0.33 ms, 0 ms, 0.66 ms, 0.33 ms, 0 ms, etc.

FIG. 5 shows the DL XR transmission 500 that includes a first video frame (identified with a "1") transmitted on the downlink at a beginning of the first long DRx cycle 200-1 having a 16.66 ms duration, a second video frame (identified with a "2") transmitted on the downlink at a beginning of the second long DRx cycle 200-2 having a 16.66 ms duration, a third video frame (identified with a "3") transmitted on the downlink at a beginning of the third long DRx cycle 200-3 having a 16.66 ms duration, and a fourth video frame (identified with a "4") transmitted on the downlink at a beginning of a fourth DRx cycle (not shown) having a 16.66 ms duration.

With the long DRx cycle lengths having a repeating sequence (e.g., long DRx cycle 200-1 of 16 ms, long DRx cycle 200-2 of 17 ms, and long DRx cycle 200-3 of 17 ms), to align the UR DRx on duration 510 with the DL XR transmission 510, the sequence of UE wait times are repeated at the UE: 0.66 ms, 0.33 ms, and 0 ms. Therefore, when the DRx long cycle 200-1 finishes after 16 ms, the UE waits a waiting time 505-1 of 0.66 ms before starting the on duration 210-2 for the UE DRx process 510, aligning the next video frame at 60 fps and its transmission on the DL. When DRx long cycle 200-2 finishes after 17 ms, the UE waits a waiting time 505-2 of 0.33 ms before starting the on duration 210-3 for the UE DRx process 510, aligning the next video frame at 60 fps and its transmission on the DL. When DRx long cycle 300-3 finishes after 17 ms, the UE waits a waiting time of 0 ms (i.e., no delay, with the on duration 210-4 starting at a same time as a beginning of a next long DRx cycle 200) before starting the on duration 210-4 since, with the cycle length of 17 ms, the video frame at 60 fps is already aligned with the on duration 210-4 for the UE DRx process 510. The sequence of DRx cycle lengths, and corresponding UE waiting times, shown in FIG. 5 may be repeated for the duration of the downlink XR traffic session involving video traffic at 60 fps.

FIG. 6 depicts an example of the generation of video traffic at 120 fps, and aligning the DRx process to a non-integer periodicity of the video traffic on the downlink using a repeating sequence of multiple integer values for DRx cycle lengths, and a corresponding repeating sequence of UE waiting times. In the example of FIG. 6, the repeating sequence of DRx cycle lengths includes 8 ms, 8 ms, 9 ms, 8 ms, 8 ms, 9 ms, etc. In conjunction with the repeating cycle of DRx cycle lengths, the UE additionally implements a repeating sequence of waiting times that include 0.33 ms, 0.66 ms, 0 ms, 0.33 ms, 0.66 ms, 0 ms, etc.

FIG. 6 shows the DL XR transmission 600 that includes a first video frame (identified with a "1") transmitted on the downlink at a beginning of the first long DRx cycle 200-1 having a 8.33 ms duration, a second video frame (identified with a "2") transmitted on the downlink at a beginning of the second long DRx cycle 200-2 having a 8.33 ms duration, a third video frame (identified with a "3") transmitted on the downlink at a beginning of the third long DRx cycle 200-3 having a 8.33 ms duration, and a fourth video frame (identified with a "4") transmitted on the downlink at a beginning of a fourth DRx cycle (not shown) having a 8.33 ms duration. With the long DRx cycle lengths having a repeating sequence (e.g., long DRx cycle 200-1 of 8 ms, long DRx cycle 200-2 of 8 ms, and long DRx cycle 200-3 of 9 ms), to align the UR DRx on duration 610 with the DL XR transmission 610, the sequence of UE wait times are repeated at the UE: 0.33 ms, 0.66 ms, and 0 ms. Therefore, when the DRx long cycle 200-1 finishes after 8 ms, the UE waits a waiting time 605-1 of 0.33 ms before starting the on duration 210-2 for the UE DRx process 610, aligning the next video frame at 120 fps and its transmission on the DL.

When DRx long cycle 200-2 finishes after 8 ms, the UE waits a waiting time 605-2 of 0.66 ms before starting the on duration 210-3 for the UE DRx process 610, aligning the next video frame at 120 fps and its transmission on the DL. When DRx long cycle 300-3 finishes after 9 ms, the UE waits a waiting time of 0 ms (i.e., no delay, with the on duration 210-4 starting at a same time as a beginning of a next long DRx cycle 200) before starting the on duration 210-4 since, with the cycle length of 9 ms, the video frame at 120 fps is already aligned with the on duration 210-4 for the UE DRx process 610. The sequence of DRx cycle lengths, and corresponding UE waiting times, shown in FIG. 6 may be repeated for the duration of the downlink XR traffic session involving video traffic at 120 fps.

Figure 7:
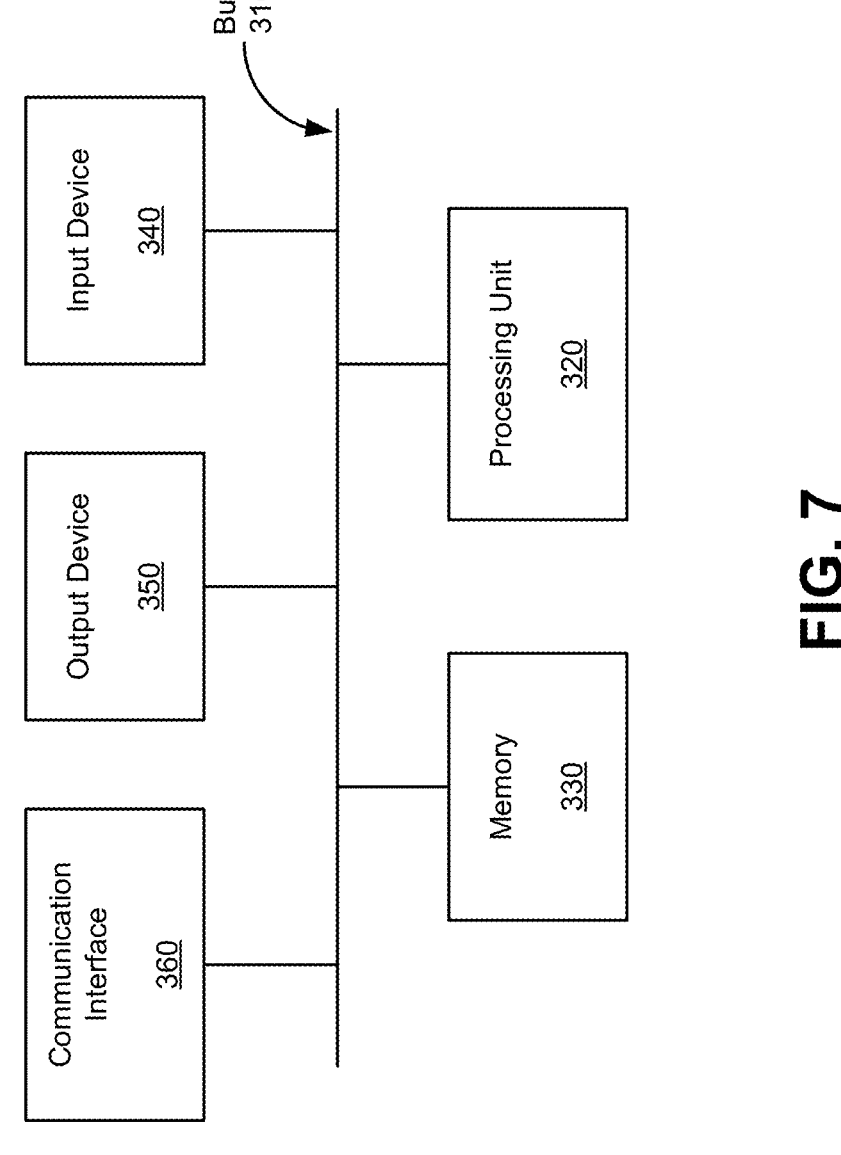
FIG. 7 is a diagram that depicts example components of a device that may correspond to the devices, or that may execute functions, that are depicted in FIGS. 1A and 1B.

FIG. 7 is a diagram that depicts example components of a device 300. UE 105 and devices implementing (or executing functions associated with) AMF 120, PCT 135, UDM 140, SMF 125, UPF 130, MME 165, HSS 175, S-GW 160, P-GW 155, PCRF 180, and/or a device(s) associated with the gNBs 185 of Next Generation RANs 145 or 147 or eNBs 190 of LTE RAN 170 may be similarly configured. Device 700 may include a bus 710, a processing unit 720, a memory 730, an input device(s) 740, an output device(s) 750, and a communication interface 760. Bus 710 may include a path that permits communication among the components of device 700.

Processing unit 720 may include one or more processors or microprocessors, or processing logic, which may interpret and execute instructions. Memory 730 may include a random access memory (RAM) or another type of dynamic storage device that may store information and instructions for execution by processing unit 720. Memory 730 may further include a Read Only Memory (ROM) device or another type of static storage device that may store static information and instructions for use by processing unit 720. Memory 730 may also include a magnetic and/or optical recording medium. Memory 730 may be referred to herein as a "tangible non-transitory computer-readable medium," a "non-transitory computer-readable medium," or a "non-transitory storage medium." In some implementations, the processes/methods set forth herein can be implemented as instructions that are stored in memory 730 for execution by processing unit 720.

Input device 740 may include one or more mechanisms that permit an operator to input information into device 700, such as, for example, a keypad or a keyboard, a display with a touch sensitive panel, voice recognition and/or biometric mechanisms, etc. Output device 750 may include one or more mechanisms that output information to the operator, including a display, a speaker, etc. Input device 740 and output device 750 may, in some implementations, be implemented as a user interface (UI) that displays UI information and which receives user input via the UI. Communication interface 760 may include one or more transceivers that enable device 700 to communicate with other devices and/or systems. For example, communication interface 760 may include wired or wireless transceivers for communicating via Next Generation Mobile Network 110, 4G Mobile Network 115, Next Generation RAN 145, NSA Next Generation RAN 147, LTE RAN 170, and/or Packet Data Network 150.

The configuration of components of device 700 illustrated in FIG. 7 is for illustrative purposes. Other configurations may be implemented. Therefore, device 700 may include additional, fewer and/or different components than those depicted in FIG. 7.

Figure 8A:
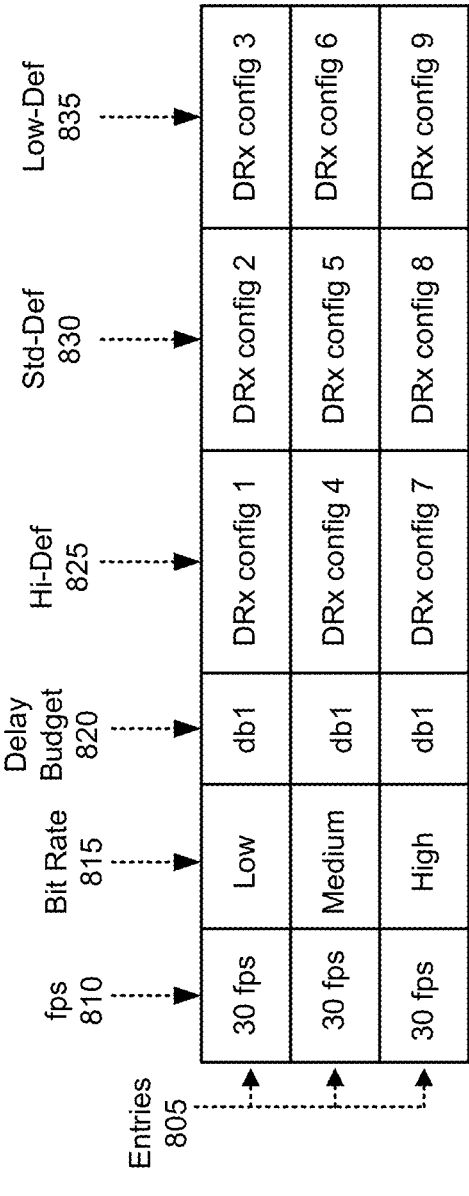
FIGS. 8A and 8B depicts examples of portions of a data structure that may be stored for use in a process described herein.
Figure 8B:
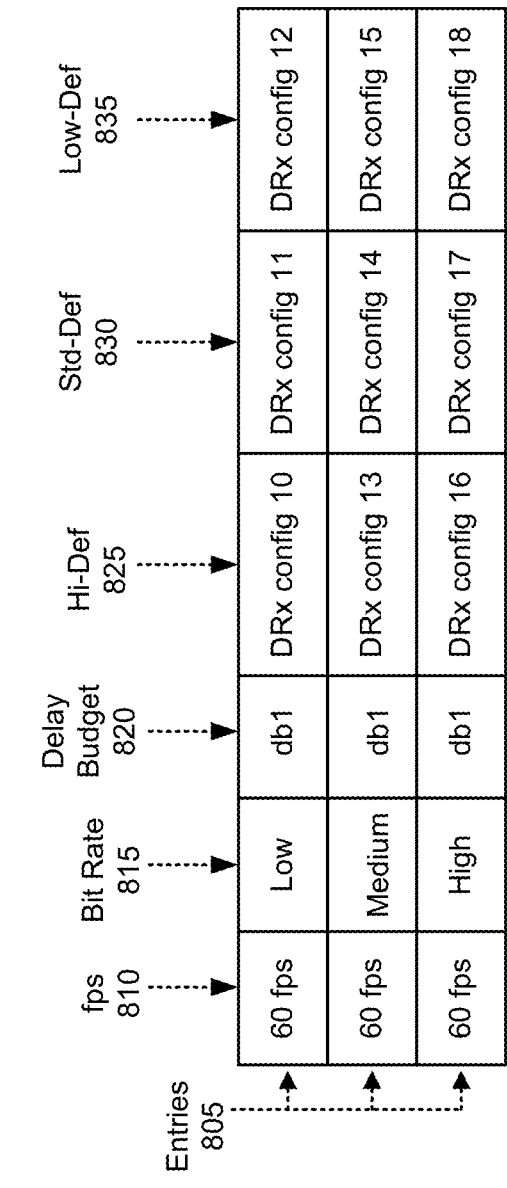

FIGS. 8A and 8B depicts examples of portions of a data structure 800 that may be stored in a memory associated with, for example, each gNB 185 of Next Generation RAN 145 or NSA Next Generation RAN 147, or each eNB 190 of LTE RAN 170, and used for retrieving DRx configuration parameters. The data structure 800 may alternatively be stored in a memory in association with one or more other devices of Next Generation RAN 145, NSA Next Generation RAN 147, LTE RAN 170, or other devices/nodes of Next Generation Mobile Network 110 and/or 4G Mobile Network 115. As shown in FIGS. 8A and 8B, the data structure 800 may include multiple entries 805, with each entry 805 including, for example, a frames per second (fps) field 810, a bit rate field 815, a delay budget field 820, a high definition DRx configuration field 825, a standard definition DRx configuration field 830, and a low definition DRx configuration field 835. FIG. 8A illustrates a portion of the data structure 800 having entries 805 related to a frame rate of 30 fps, and FIG. 8B illustrates a portion of the data structure 800 having entries 805 related to a frame rate of 60 fps.

Fps field 810 may store a parameter that indicates a particular frame rate (fps) at which video frames are generated and transmitted on the downlink for a session (e.g., an XR session involving a UE 105). Sessions involving video may, for example, have a frame rate of 30 fps, 60 fps, or 120 fps.

Bit rate field 815 stores a bit rate parameter that indicates a particular bit rate level corresponding to a measured downlink UE radio link quality. Radio link conditions at a particular UE 105 results in an effective bit rate level on the downlink between a gNB/eNB and the UE 105. The bit rate level indicated by the bit rate parameter stored in field 810 may include bit rate ranges that may equate to, for example, a low bit rate, a medium bit rate, and a high bit rate.

Delay budget field 820 stores a parameter that indicates a maximum amount of delay that a session may experience without negatively impacting the XR experience at a UE 105. The delay may include, for example, latency on the downlink and/or any delay introduced by a gNB or eNB on a traffic stream on the downlink.

High definition DRx configuration field 825 stores a set of DRx parameters associated with high definition video having a particular frame rate indicated in field 810, a downlink bit rate indicated in field 815, and a delay budget indicated in field 820. Therefore, for a downlink session having a particular frame rate, downlink bit rate, and delay budget matching fields 810, 815, and 820, and including high definition video, the DRx configuration parameters stored in field 825 of an entry 805 may be retrieved to set the DRx parameters at a UE 105 for a downlink session. The DRx parameters may include a repeating sequence of DRx cycle length parameters, DRx OnDuration Timer parameter, DRx offset parameter(s), and a repeating sequence of waiting time parameters, as described further below with respect to blocks 920-935 of the example process of FIGS. 9A and 9B.

Standard definition DRx configuration field 830 stores a set of DRx parameters associated with standard definition video having a particular frame rate indicated in field 810, a downlink bit rate indicated in field 815, and a delay budget indicated in field 820. Therefore, for a downlink session having a particular frame rate, downlink bit rate, and delay budget matching fields 810, 815, and 820, and including standard definition video, the DRx configuration parameters stored in field 825 of an entry 805 may be retrieved to set the DRx parameters at a UE 105 for a downlink session. The DRx parameters may include a same or similar set of DRx parameters as those described above with respect to the high definition DRx configuration field 825.

Low definition DRx configuration field 835 stores a set of DRx parameters associated with low definition video having a particular frame rate indicated in field 810, a downlink bit rate indicated in field 815, and a delay budget indicated in field 820. Therefore, for a downlink session having a particular frame rate, downlink bit rate, and delay budget matching fields 810, 815, and 820, and including low definition video, the DRx configuration parameters stored in field 835 of an entry 805 may be retrieved to set the DRx parameters at a UE 105 for a downlink session. The DRx parameters may include a same or similar set of DRx parameters as those described above with respect to the high definition DRx configuration field 825.

To locate a particular entry 805 for retrieving DRx configuration parameters for a session, the data structure 800 may be queried with particular data to locate an entry 805 having matching data stored in fields 810, 815, and 820. When such an entry 805 is located, a level of the video resolution (e.g., high, standard, of low definition) of the video of the session is used to select which of fields 825, 830, or 835 from which to retrieve the DRx configuration parameters. For example, referring to the portion of the data structure 800 shown in FIG. 8A, if a UE 105 involved in a session has a low bit rate and the session involves video at a frame rate of 30 fps, a delay budget of db1, and high definition resolution, then the DRx configuration parameters stored in field 825 of the first entry 805 may be retrieved for use by the UE 105 for the session. As another example, referring to the portion of the data structure 800 shown in FIG. 8B, if a UE 105 involved in a session has a high bit rate and the session involves video at a frame rate of 60 fps, a delay budget of db1, and low definition resolution, then the DRx configuration parameters stored in field 835 of the third entry 805 may be retrieved for use by the UE 105 for the session.

The data structure 800 of FIGS. 8A and 8B is depicted as including a tabular data structure with a certain number of fields having certain content. The tabular data structure shown in FIGS. 8A and 8B, however, is for illustrative purposes. Other types of data structures may alternatively be used. The number, types, and content of the entries and/or fields in the data structures illustrated in FIGS. 8A and 8B are also for illustrative purposes. Other data structures having different numbers, types, and/or content of the entries and/or the fields may be implemented. Therefore, the data structure 800 depicted in FIGS. 8A and 8B may include additional, fewer and/or different entries and/or fields than those shown.

FIGS. 9A and 9B are flow diagrams of an example process for implementing DRx for XR traffic UE power savings. The example process of FIGS. 9A and 9B may be implemented by a gNB 185 of a Next Generation RAN 145, a gNB 185 of NSA Next Generation RAN 147, or an eNB 190 of an LTE RAN 170, in conjunction with a UE 105. The example process of FIGS. 9A and 9B may alternatively, or additionally, be implemented by other nodes within Next Generation Mobile Network 110 or 4G Mobile Network 115. The example process of FIGS. 9A and 9B may, for example, be repeated periodically, or upon an occurrence of a particular event (e.g., at a beginning of each new session involving XR downstream traffic destined for a UE 105).

The example process may include a gNB 185/eNB 190 determining a periodicity of downstream traffic destined for a UE 105 (block 900). The periodicity may relate to a number of frames per second of the downstream traffic. For example, video downstream traffic generated at a 30 fps frame rate has a periodicity of 33.33 ms. As another example, video downstream traffic generated at a 60 fps frame rate has a periodicity of 16.66 ms. As a further example, video downstream traffic generated at a 120 fps frame rate has a periodicity of 8.33 ms. In one implementation, the gNB 185/eNB 190 may measure the periodicity on the downstream traffic. In another implementation, the gNB 185/eNB 190 may identify the type of traffic (e.g., XR traffic) and/or the frame rate of the traffic based on an identification of the application that is generating the downstream traffic for sending to the destination UE 105. In yet another implementation, the gNB 185/eNB 190 may consult a history of downstream traffic received by the UE 105 (e.g., a history of a type of downstream traffic received by the UE 105), and identify the periodicity of the downstream traffic based on this historical information.

The gNB 185/eNB 190 determines a volume of the UE's downstream traffic (block 905). The volume of the downstream traffic may relate to the resolution (e.g., pixels per frame) of each frame of video. The video resolution may, for example, equal low definition, medium definition, or high definition resolution. The video resolution determined in block 905, by itself, or in combination with the frame rate, determined in block 900, may be used to determine the volume of the UE's downstream traffic. A high volume (e.g., high definition) of downstream traffic may require a longer "on duration" of the DRx process at the receiving UE 105, and a low volume (e.g., low definition) of downstream traffic may require a shorter "on duration" of the DRx process at the UE 105. A medium volume (e.g., medium definition) of downstream traffic may require a moderate length "on duration" of the DRx process at the receiving UE 105. A low volume (e.g., low definition) of downstream traffic may require a short length "on duration" of the DRx process at the receiving UE 105.

The gNB 185/eNB 190 determines a downlink radio link quality at the UE 105 (block 910). The gNB 185/eNB 190 may, for example, receive a radio link quality report from the UE 105. In one implementation, the radio link quality report may include an effective downlink bit rate measured at the UE 105, where the effective downlink bit rate provides an indication of the downlink radio link quality. In other implementations, different radio link quality parameters, in addition to or as alternatives to, the downlink bit rate may be used by the gNB 185/eNB 190 for ascertaining the downlink radio link quality.

The gNB 185/eNB 190 determines a delay budget associated with the UE 105's downstream traffic (block 915). Each type of downstream traffic may have an associated delay budget which, when exceeded, causes a degradation in the quality of the experience of the user at the UE 105. For example, if the downstream traffic is XR traffic, having primarily video content, delay on the downlink that exceeds the delay budget may cause the video to pause or freeze when viewed by the user at the UE 105. As described above, the gNB 185/eNB 190 may, in one implementation, identify the type of traffic (e.g., XR traffic) based on an identification of the application that is generating the downstream traffic for sending to the destination UE 105. In another implementation, the gNB 185/eNB 190 may consult a history of downstream traffic received by the UE 105 (e.g., a history of a type of downstream traffic), and identify a delay budget associated with the downstream traffic based on this historical information.

The gNB 185/eNB 190 sets a repeating sequence of multiple values of DRx cycle length parameters to compensate for the determined periodicity of the UE's downstream traffic (block 920). XR traffic may have a non-integer periodicity (e.g., 33.33 ms at 30 fps, 16.66 ms at 60 fps, 8.33 ms at 120 fps), and the repeating sequence of multiple values of the DRx cycle length parameters, in conjunction with the repeating sequence of waiting time values described with respect to block 930 below, may compensate for this non-integer periodicity. The gNB 185/eNB 190 sets the repeating sequence of multiples values of DRx cycle length parameters such as shown in FIGS. 4-6 for video traffic at 30 fps, 60 fps, and 120 fps. For example, as shown in FIG. 4, the repeating sequence of DRx cycle length parameters (e.g., long DRx cycles 200-1, 200-2, 200-3, etc.) for video traffic at 30 fps includes the repeating sequence of 33 ms, 33 ms, 34 ms, 33 ms, 33 ms, 34 ms, etc. As a further example, as shown in FIG. 5, the repeating sequence of DRX cycle length parameters for video traffic at 60 fps includes the repeating sequence of 16 ms, 17 ms, 17 ms, 16 ms, 17 ms, 17 ms, etc. As another example, as shown in FIG. 6, the repeating sequence of DRx cycle length parameters for video traffic at 120 fps includes the repeating sequence of 8 ms, 8 ms, 9 ms, 8 ms, 8 ms, 9 ms, etc.

In one implementation, the gNB 185/eNB 190 may perform a query of the data structure 800 of FIGS. 8A and 8B to find an entry 805 with values stored in fps field 810, bit rate field 815, and delay budget field 820 that matches the periodicity, downlink radio link quality, and delay budget determined in blocks 900, 910, and 915. A level of the video resolution (e.g., high, standard, of low definition) of the video of the session is then used to select which of fields 825, 830, or 835 from which to retrieve DRx configuration parameters. For example, referring to the portion of the data structure 800 shown in FIG. 8A, if a UE 105 involved in a session has a low bit rate and the session involves video at a frame rate of 30 fps, a delay budget of db1, and high definition resolution, then the DRx configuration parameters stored in field 825 of the first entry 805 may be retrieved for use by the UE 105 for the session. The retrieved DRx configuration parameters may include a repeating sequence of multiple values of DRx cycle length parameters for use in block 920, a DRx OnDuration timer parameter for use in block 925 below, and/or the DRx offset parameter(s) and repeating sequence of waiting time parameters for use in block 930 below.

The gNB 185/eNB 190 sets the DRx OnDuration timer parameter based on the determined volume, radio link quality, and delay budget for the UE 105's downstream traffic (block 925). A higher traffic volume relates to an increased value of the DRx OnDuration timer parameter, and a lower traffic volume relates to a decreased value of the DRx OnDuration timer parameter. A higher radio link quality relates to a decreased value of the DRx OnDuration timer parameter, and a lower radio link quality rates to an increased value of the DRx OnDuration timer parameter. A higher delay budget relates to a decreased value of the DRx OnDuration timer parameter, and a lower delay budget relates to a decreased value of the DRx OnDuration timer parameter. A functional relationship between the traffic volume, the radio link quality, and the delay budget (e.g., OnDuration Timer value=ƒ(traffic volume, radio link quality, delay budget)) may be used to determine at what value to set the DRx OnDuration timer parameter. In one implementation, the DRx OnDuration timer parameter may be one of the DRx configuration parameters retrieved by a query of data structure 800, as described above with respect to block 920.

The gNB 185/eNB 190 sets the DRx offset parameter(s), and a repeating sequence of waiting time parameters, to align the UE 105's DRX "on time" duration with arrival times of the downstream traffic having the determined periodicity (block 930). Referring back to FIG. 3, the DRx offset parameter(s) may include one or more of the DRx-StartOffset parameter 320 or the DRx-SlotOffset parameter 325. As described above, the DRx-StartOffset parameter 320 specifies the particular subframe 310 at which the long DRx cycle 200-1 of the DRx process 300 starts, and the DRx-SlotOffset parameter 325 specifies the particular time slot 315 within the subframe, specified by the DRx-StartOffset parameter 325, at which the long cycle DRx cycle 200-1 of the DRx process 300 starts. The waiting time parameters, as described above with respect to FIGS. 4-6, delay, relative to a start of each DRx cycle (e.g., long DRx cycle 200), the powering on of the UE 105 receiver for receiving the downlink transmission from gNB 185/3NB 190 at a repeating sequence of intervals. For example, referring to the 30 fps video traffic of FIG. 4, after a first DRx cycle of 33 ms, the UE 105 implements a 0.33 ms UE waiting time 405-1 to align the UE Rx on duration 210-2 with the DL transmission 400 (identified with a "2" within a circle). As further shown in FIG. 4, after a second DRx cycle of 33 ms, the UE implements a 0.66 ms UE waiting time 405-2 to align the UE Rx on duration 210-3 with the DL transmission 400 (identified with a "3" within a circle). As additionally shown in FIG. 4, after a third DRx cycle of 34 ms, the UE implements a 0 second UE waiting time since the UE Rx on duration 210-4 is already aligned, due to the sequence of DRx cycle lengths (e.g., 33 ms, 33 ms, and 34 ms), to the DL transmission 400 (identified with a "4" within a circle). In one implementation, the DRx offset parameter(s), and repeating sequence of UE waiting time parameters, may be some of the DRx configuration parameters retrieved by a query of data structure 800, as described above with respect to block 920.

The gNB 185/eNB 190 generates DRx instructions, including the repeating sequence of DRx cycle length parameters, the DRx OnDuration Timer parameter, the DRx offset parameter(s), and the repeating sequence of waiting time parameters (block 935) and sends the DRx instructions to the downstream traffic's destination UE 105 (block 940). The gNB 185/eNB 190 retrieves the repeating sequence of DRx cycle length parameters previously set in block 920, the OnDuration timer parameter previously set in block 925, and the DRx offset parameter(s) and the repeating sequence of waiting time parameters set in block 930, and generates the DRx instructions based on the retrieved parameters. The gNB 185/eNB 190 then sends the DRx instructions to the UE 105 that is the destination of the downstream traffic.

The gNB 185/eNB 190 determines the UE 105's downlink resource allocation based on the DRx cycle length parameters, the DRx OnDuration Timer parameter, the DRx offset parameter(s), and the waiting time parameters (block 945), and generates a Downlink Control Information (DCI) message indicating the UE 105's downlink resource allocation and sends the DCI message to the UE 105 via, for example, the PDCCH (block 950). The PDCCH includes a physical channel over which the DCI can be sent to the UE 105 in a current subframe. The PDCCH may, for example, occupy a first n OFDM symbols of a subframe. The DCI may specify a physical resource block (PRB), which includes a combination of time domain, frequency domain, and a modulation scheme, that comprises the downlink resource allocation. The DCI, for example, includes data that indicates, among other downlink resources, which slot(s), which subframe(s), and what modulation scheme to use for the UE 105 to receive and decode the downlink traffic stream.

The gNB 185/eNB 190 sends session traffic to the UE 105 on the downlink in accordance with the UE's downlink resource allocation (block 955). For example, the gNB 185/eNB 190 sends the session traffic to the UE 105 on the downlink using the slot(s), subframe(s), and modulation scheme of the PRB specified in the DCI sent to the UE 105.

The UE 105 implements a DRx process, based on the received DRx instructions, to receive the downlink traffic from the gNB 185/eNB 190 (block 960). The DRx process implemented by the UE 105 uses the repeating sequence of DRx cycle length parameters, the DRx OnDuration timer parameter, the DRx offset parameter(s), and/or the repeating sequence of waiting time parameters to synchronize and align the periodicity and beginning of the "on duration" of the UE 105's receiver with the non-integer periodicity of the downlink traffic stream that may include, for example, XR traffic. The DRx process implemented by the UE 105 may correspond to that shown for video traffic at 30 fps in FIG. 4, video traffic at 60 fps in FIG. 5, or video traffic at 120 fps in FIG. 6.

The foregoing description of implementations provides illustration but is not intended to be exhaustive or to limit the invention to the precise form disclosed. Modifications and variations are possible in light of the above teachings or may be acquired from practice of the invention. For example, while a series of blocks have been described with respect to FIGS. 9A and 9B, the order of the blocks may be varied in other implementations. Moreover, non-dependent blocks may be performed in parallel. Modification of DRx long cycle parameters have been described herein, including the repeating sequence of DRx cycle length parameters of block 920 of FIG. 9A. Additionally, or alternatively, a repeating sequence of values of DRx short cycle parameters (e.g., DRxShortCycle=$t_a$, $t_a$, $t_b$, $t_a$, $t_a$, $t_b$) may be used in the DRx process described herein. Example embodiments have been described herein as modifying DRx parameters to compensate for the non-integer periodicity of XR traffic. The example embodiments described herein, though, may be applied to DRx for any type of traffic having non-integer periodicity.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
determining a periodicity of downstream traffic destined for a User Equipment device (UE);
determining a downlink radio link quality at the UE;
setting a value of at least one Discontinuous Reception (DRx) cycle length parameter to compensate for the determined periodicity of the downstream traffic;
setting a value of a DRx OnDurationTimer parameter based on the determined downlink radio link quality at the UE;
generating UE DRx instructions that include the at least one DRx cycle length parameter and the DRx OnDurationTimer parameter; and sending the UE DRx instructions to the UE for implementing DRx at the UE.

2. The method of claim 1, wherein the at least one DRx cycle length parameter comprises at least one of a DRx long cycle timer or a DRx short cycle timer.

3. The method of claim 1, wherein determining the periodicity of the downstream traffic comprises determining a non-integer periodicity of the downstream traffic, and wherein setting the value of the at least one DRx cycle length parameter further comprises:

setting a repeating sequence of multiple values of DRx cycle length parameters to compensate for the determined non-integer periodicity of the downstream traffic, wherein the repeating sequence of multiple values of DRx cycle length parameters comprises a first DRx cycle length parameter having a first value, a second DRx cycle length parameter having a second value, and a third DRx cycle length parameter having a third value, and wherein one of the first, second, and third values is different than the other values.

4. The method of claim 1, wherein determining the periodicity of the downstream traffic further comprises:

determining a video frame rate associated with the downstream traffic; and determining the periodicity based on the determined video frame rate associated with the downstream traffic.

5. The method of claim 1, wherein the downstream traffic comprises video traffic or Extended Reality (XR).

6. The method of claim 1, further comprising:

determining a video frame rate and a video resolution associated with the downstream traffic, wherein setting the value of the DRx OnDuration Timer parameter is further based on the determined video frame rate and the video resolution.

7. The method of claim 6, wherein the video resolution comprises a number of pixels per frame of frames of the downstream traffic.

8. The method of claim 1, further comprising:

setting a value of at least one DRx offset parameter, and a waiting time parameter, to align a DRx on time duration of the UE, corresponding to the DRx OnDuration Timer parameter, with arrival times of the downstream traffic having the determined periodicity, and wherein the UE DRx instructions further include the at least one DRx offset parameter and the waiting time parameter.

9. The method of claim 1, further comprising:

determining a delay budget associated with the downstream traffic, wherein setting the value of the DRx OnDurationTimer parameter is further based on the determined delay budget associated with the downstream traffic.

10. The method of claim 1, further comprising:

determining a downlink resource allocation based on the at least one DRx cycle length parameter, the DRx OnDuration Timer parameter, the at least one DRx offset parameter, and the waiting time parameter;

generating downlink control information (DCI) based on the determined downlink resource allocation; and sending the DCI to the UE on a downlink control channel.

11. A device, comprising:

at least one communication interface configured to connect to a Radio Access Network (RAN) and to a User Equipment device (UE); and a processing unit configured to:

determine a periodicity of downstream traffic destined for the UE, determine a downlink radio link quality at the UE, set a value of at least one Discontinuous Reception (DRx) cycle length parameter to compensate for the determined periodicity of the downstream traffic, set a value of a DRx OnDurationTimer parameter based on the determined downlink radio link quality at the UE, generate UE DRx instructions that include the at least one DRx cycle length parameter and the DRx OnDurationTimer parameter, and send, via the at least one communication interface, the UE DRx instructions to the UE for implementing DRx at the UE.

12. The device of claim 11, wherein the at least one DRx cycle length parameter comprises at least one of a DRx long cycle timer or a DRx short cycle timer.

13. The device of claim 11, wherein determining the periodicity of the downstream traffic comprises determining a non-integer periodicity of the downstream traffic, and wherein, when setting the value of the at least one DRx cycle length parameter, the processing unit is further configured to:

set a repeating sequence of multiple values of DRx cycle length parameters to compensate for the determined non-integer periodicity of the downstream traffic, wherein the repeating sequence of multiple values of DRx cycle length parameters comprises a first DRx cycle length parameter having a first value, a second DRx cycle length parameter having a second value, and a third DRx cycle length parameter having a third value, and wherein one of the first, second, and third values is different than the other values.

14. The device of claim 11, wherein, when determining the periodicity of the downstream traffic, the processing unit is further configured to:

determine a video frame rate associated with the downstream traffic; and determine the periodicity based on the determined video frame rate associated with the downstream traffic.

15. The device of claim 11, further comprising:

determining a delay budget associated with the downstream traffic, wherein setting the value of the DRx OnDurationTimer parameter is further based on the determined delay budget associated with the downstream traffic.

16. A non-transitory storage medium storing instructions executable by a device, wherein execution of the instructions cause the device to:

determine a periodicity of downstream traffic destined for a User Equipment device (UE);

determine a downlink radio link quality at the UE;

set a value of at least one Discontinuous Reception (DRx) cycle length parameter to compensate for the determined periodicity of the downstream traffic;

set a value of a DRx OnDurationTimer parameter based on the determined downlink radio link quality at the UE;

generate UE DRx instructions that include the at least one DRx cycle length parameter and the DRx OnDuration Timer parameter; and send the UE DRx instructions to the UE for implementing DRx at the UE.

17. The non-transitory storage medium of claim 16, wherein the at least one DRx cycle length parameter comprises at least one of a DRx long cycle timer or a DRx short cycle timer.

18. The non-transitory storage medium of claim 16, wherein determining the periodicity of the downstream traffic comprises determining a non-integer periodicity of the downstream traffic, and wherein execution of the instructions to cause the device to set the value of the at least one DRx cycle length parameter further comprises execution of the instructions to cause the device to:

set a repeating sequence of multiple values of DRx cycle length parameters to compensate for the determined non-integer periodicity of the downstream traffic, wherein the repeating sequence of multiple values of DRx cycle length parameters comprises a first DRx cycle length parameter having a first value, a second DRx cycle length parameter having a second value, and a third DRx cycle length parameter having a third value, and wherein one of the first, second, and third values is different than the other values.

19. A method, comprising:

determining a periodicity of downstream traffic destined for a User Equipment device (UE);

determining a volume of the downstream traffic;

determining a downlink radio link quality at the UE;

determining a delay budget associated with the downstream traffic;

setting a value of at least one Discontinuous Reception (DRx) cycle length parameter to compensate for the determined periodicity of the downstream traffic;

setting a value of a DRx OnDuration Timer parameter based on the determined volume of the downstream traffic, the determined downlink radio link quality at the UE, and the determined delay budget associated with the downstream traffic;

setting a value of at least one DRx offset parameter, and a waiting time parameter, to align a DRx on time duration of the UE with arrival times of the downstream traffic having the determined periodicity;

generating UE DRx instructions that include the at least one DRx cycle length parameter, the DRx OnDuration Timer parameter, the at least one DRx offset parameter, and the waiting time parameter; and sending the UE DRx instructions to the UE for implementing DRx at the UE.

20. The method of claim 19, wherein the determined volume of the downstream traffic comprises a determined video frame rate and a video resolution associated with the downstream traffic, and wherein setting the value of the DRx OnDurationTimer parameter is further based on the determined video frame rate and the video resolution.

* * * * *